US012316395B2

(12) United States Patent
Kudo et al.

(10) Patent No.: US 12,316,395 B2
(45) Date of Patent: May 27, 2025

(54) COMMUNICATION SYSTEM AND TERMINAL

(71) Applicant: NIPPON TELEGRAPH AND TELEPHONE CORPORATION, Tokyo (JP)

(72) Inventors: Riichi Kudo, Musashino (JP); Takeru Inoue, Musashino (JP); Atsushi Taniguchi, Musashino (JP); Kohei Mizuno, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 852 days.

(21) Appl. No.: 17/605,347

(22) PCT Filed: Apr. 26, 2019

(86) PCT No.: PCT/JP2019/017946
§ 371 (c)(1),
(2) Date: Jun. 14, 2022

(87) PCT Pub. No.: WO2020/217458
PCT Pub. Date: Oct. 29, 2020

(65) Prior Publication Data
US 2022/0352995 A1 Nov. 3, 2022

(51) Int. Cl.
*H04B 17/373* (2015.01)
*G06V 10/72* (2022.01)
(Continued)

(52) U.S. Cl.
CPC ........... *H04B 17/373* (2015.01); *G06V 10/72* (2022.01); *G06V 10/774* (2022.01); *G06V 20/50* (2022.01)

(58) Field of Classification Search
CPC .................................................... H04B 17/373
See application file for complete search history.

(56) References Cited

U.S. PATENT DOCUMENTS 11,301,762 B1 * 4/2022 Chen ...................... G06N 5/027
11,922,284 B1 * 3/2024 Pirozzi .................... G06N 5/04
(Continued)

OTHER PUBLICATIONS

IEEE Std 802.11 ac (TM)-2013, IEEE Standard for Information Technology—Telecommunications and Information Exchange Between Systems Local and Metropolitan Area Networks—Specific requirements, Part 11: Wireless LAN Medium Access Control (MAC) and Physical Layer (PHY) Specifications, Dec. 2016.
(Continued)

*Primary Examiner* — Melanie Jagannathan
(74) *Attorney, Agent, or Firm* — Harness, Dickey & Pierce, P.L.C.

(57) ABSTRACT

An object is to provide a communication system and a terminal capable of predicting future communication quality in order to enable variations in communication quality due to variations in environment to be addressed. A communication system and a terminal according to the present invention learn an input and output relationship from terminal information such as surrounding environment information of the terminal that can be acquired by a camera, a sensor, or the like, and position information of the terminal and current communication quality to generate a learning model, and predict future communication quality using the learning model, the surrounding environment information and the terminal information.

11 Claims, 9 Drawing Sheets

(51) Int. Cl.
G06V 10/774 (2022.01)
G06V 20/50 (2022.01)

(56) References Cited

U.S. PATENT DOCUMENTS

| | | | | |
|---|---|---|---|---|
| 2016/0300252 | A1* | 10/2016 | Frank | G06F 21/6245 |
| 2016/0343056 | A1* | 11/2016 | Hu | G06Q 30/0631 |
| 2020/0367067 | A1* | 11/2020 | Haley | H04W 52/242 |
| 2021/0287459 | A1* | 9/2021 | Cella | G07C 5/0808 |
| 2023/0214583 | A1* | 7/2023 | Sawyer | G06V 30/19173 |

OTHER PUBLICATIONS

Ghosh, Amitava, et al. "Millimeter-wave Enhanced Local Area Systems: A high-data-rate Approach for Future Wireless Networks." IEEE Journal on Selected Areas in Communications 32.6 (2014): 1152-1163.

H. Okamoto, et al. [Technical Exhibition] "Real time Throughout Estimation Using Depth Images for mmWave Communications" IEICE Technical Report, SR2016-55 (Oct. 2016), The Institute of Electronics, Information and Communication Engneering.

H. Okamoto, et al. "Throughput Estimation Using Online Machine Learning Algorithm from Depth-images for mmWave Communications", IEICE Technical Report, SR2015-96 (Mar. 2016), The Institute of Electronics, Information and Communication Engneering.

* cited by examiner

COMMUNICATION SYSTEM AND TERMINAL

TECHNICAL FIELD

The present disclosure relates to prediction of communication quality in a system in which communication quality varies due to a surrounding environment and control performed by a terminal with a communication device mounted therein.

BACKGROUND ART

Internet of things (IoT) in which various devices are connected to the Internet has been increasingly realized, and connection of various devices such as vehicles, drones, and construction machinery vehicles is in progress. Supporting wireless standards such as a wireless local area network (LAN), Bluetooth (registered trademark), LTE or 5G cellular communication, low power wide area (LPWA) for IoT, an electronic toll collection system (ETC), Vehicle Information and Communication System (VICS) (registered trademark), and ARIB-STD-T109 that are defined by the standard specification IEEE802.11 as wireless communication standards have been developed, and distribution in the future is expected.

Wireless communication has been used for various applications, but wireless communication does not always meet required conditions for communication quality depending on services, which is problematic. For example, since high frequencies in a millimeter band are used for 5G of IEEE 802.11ad and cellular communication, blocking due to shielding objects between transmission and reception in wireless communication causes a serious problem. Blocking due to shielding objects and changes in propagation environments due to motion of reflecting objects affect communication quality of wireless communication not only at frequencies in a millimeter wave band but also at other frequencies. In addition, it is also known that Doppler shift caused by movement of a reflecting object affects communication.

CITATION LIST

Non Patent Literature

Non Patent Literature 1: IEEE Std 802.11ac (TM)-2013, IEEE Standard for Information Technology-Telecommunications and Information Exchange Between Systems Local and Metropolitan Area Networks-Specific Requirements, Part 11: Wireless LAN Medium Access Control (MAC) and Physical Layer (PHY) Specifications, December 2013

Non Patent Literature 2: Ghosh, Amitava, et al. "Millimeter-wave Enhanced Local Area Systems: A High-data-rate Approach for Future Wireless Networks." IEEE Journal on Selected Areas in Communications 32.6 (2014): 1152-1163.

SUMMARY OF THE INVENTION

Technical Problem

In a case in which wireless communication functions are implemented in vehicles, drones, construction machinery vehicles, robots, and other devices and there are required conditions in relation to throughputs, delays, continuity, stability, and other aspects of communication quality for the communication thereof, there is a problem that communication quality due to changes in surrounding environment significantly affects services and systems provided by the devices.

Thus, in view of the aforementioned circumstances, an object of the present invention is to provide a communication system and a terminal capable of predicting future communication quality in order to enable variations in communication quality due to variations in environment to be addressed.

Means for Solving the Problem

A communication system according to the present invention is adapted such that a device that has a wireless communication function predicts future communication quality from information regarding control of the device itself or a change in surrounding environmental information using information from a camera, a sensor, and another surrounding environment information collection device that acquire information on a surrounding environment.

Specifically, a communication system according to the present invention is a communication system including an external device that communicates with a terminal, the system including: an object detection unit that extracts a predetermined object from surrounding information about the terminal's surroundings and outputs the predetermined object along with a feature amount of the object as object information; a communication quality learning unit that performs machine learning on a relationship between quality of communication between the external device and the terminal, and the object information to generate a learning model; and a communication prediction unit that applies the object information output by the object detection unit to the learning model generated by the communication quality learning unit to predict communication quality of a predetermined period of time later.

Machine learning of a relationship between a circumstance in the surroundings of the device and a communication state is performed in advance to form a learning model. The communication system can predict future communication quality from the current circumstance in the surroundings of the device using the learning model. Therefore, the communication system can prepare a countermeasure against variations in future communication quality in advance such that the device is not affected or affected less. The present invention can thus provide a communication system capable of predicting future communication quality in order to enable variations in communication quality to be addressed.

In the communication system according to the present invention, the object information is obtained by performing statistical processing on a plurality of pieces of the object information acquired at different times. It is possible to reduce a burden of performing an arithmetic operation for predicting communication quality.

The communication system according to the present invention further includes: a terminal management unit that generates terminal information that is information related to the terminal, the communication quality learning unit generates the learning model with the terminal information also included in the relationship, and the communication prediction unit predicts the communication quality with the terminal information also included. It is possible to improve precision of predicting the communication quality.

The communication system according to the present invention further includes: a communication device positional relationship generation unit that generates positional relationship information from positions of the terminal and the external device, the communication quality learning unit generates the learning model with the positional relationship information also included in the relationship, and the communication prediction unit predicts the communication quality with the positional relationship information also included. It is possible to improve precision of predicting the communication quality.

In the communication system according to the present invention, the communication quality learning unit uses steady time communication quality obtained by collecting information regarding the communication quality to terminal information that is information for a specific period of time and performing statistical processing (for example, exclusion of a mode value, an average value, or a singularity determined therefrom) on the collecting information, to perform machine learning with the communication quality that is more than a predetermined threshold value away from the steady time communication quality for the terminal information. It is possible to predict communication quality only for a state that is significantly different from the steady state by recognizing the steady state in advance and to reduce a burden of performing an arithmetic operation for predicting communication quality and a burden of controlling the device.

The communication system according to the present invention further includes: an updating unit that updates an object definition that designates the predetermined object extracted by the object detection unit. It is possible to improve precision of predicting the communication quality.

A terminal according to the present invention is a terminal that the aforementioned communication system includes, the terminal including: the object detection unit; the communication quality learning unit; and the communication prediction unit.

Note that the terminal according to the present invention may include, for creating a learning model outside the terminal: the object detection unit; the communication prediction unit; and a communication unit, and the communication unit may transfer the communication quality and the object information to the communication quality learning unit that is provided outside, and receive the learning model from the communication quality learning unit to transfer the learning model to the communication prediction unit.

Further, the terminal according to the present invention may include, for introducing and correcting learning models from other terminals and generating a learning model adapted to the terminal itself: the object detection unit; the communication quality learning unit; the communication prediction unit; and a communication unit, the communication unit may transfer the communication quality and the object information to a different communication quality learning unit that is provided outside, and receive the learning model from the different communication quality learning unit to transfer the learning model to the communication quality learning unit, the communication quality learning unit may update the learning model from the different communication quality learning unit using the object information and terminal information that is information related to the terminal itself, and the communication prediction unit may predict communication quality using the learning model updated by the communication quality learning unit.

Effects of the Invention

According to the present invention, it is possible to predict communication quality indicating a throughput, a delay, continuity, stability, and variations thereof in uplink or downlink communication between a wireless base station and a terminal using surrounding environment information obtained by a surrounding environment information collection device such as a camera or a sensor and terminal information including position information of the external device with which the terminal communicates.

DESCRIPTION OF EMBODIMENTS

Embodiments of the present invention will be described with reference to the accompanying drawings. The embodiments described below are examples of the present invention and the present invention is not limited to the embodiments described below. Note that components with the same reference signs in the specification and the drawings are assumed to be the same components.

First Embodiment

Figure 1:
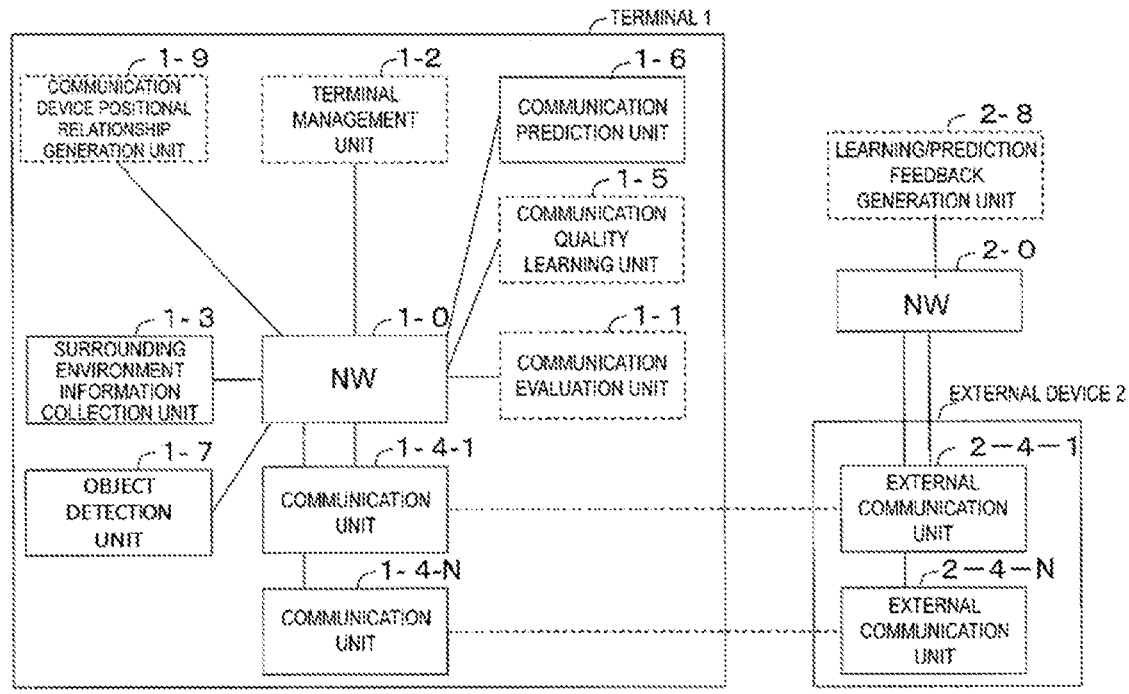
FIG. 1 is a diagram for explaining a communication system according to the present invention.

FIG. 1 is a block diagram illustrating a configuration example of a communication system according to the first embodiment. The communication system is a communication system that includes an external device 2 that communicates with a terminal 1, the communication system including: an object detection unit 1-7 that extracts a predetermined object from surrounding information of the terminal 1 and outputs the predetermined object along with a feature amount of the object as object information; a communication quality learning unit 1-5 that performs machine learning for a relationship between quality of communication between the external device 2 and the terminal 1 and the object information to generate a learning model; and a communication prediction unit 1-6 that predicts communication quality of a predetermined period of time later from the object information output by the object detection unit 1-7 using the learning model generated by the communication quality learning unit 1-5.

In the present embodiment, the terminal 1 includes the object detection unit 1-7, the communication quality learning unit 1-5, and the communication prediction unit 1-6.

The communication prediction system includes: a terminal 1 that performs communication with an external communication device 2 using a communication unit 1-4; a communication evaluation unit 1-1 that evaluates the communication; a surrounding environment information acquisition unit 1-3 that acquires surrounding environment information of the terminal 1; a terminal management unit 1-2 that generates terminal information of the terminal 1 and controls the terminal, a terminal component, and terminal communication; a communication quality learning unit 1-5 that learns communication quality using the surrounding environment information and the terminal information and learns an input and output relationship for predicting communication quality at that time or in the future from that time; and a communication prediction unit 1-6 that outputs a prediction value of the future communication quality from the input surrounding environment information and the terminal information using the input and output relationship.

Note that the terminal information includes one or more pieces of information such as control/position information/an orientation/a posture/an ID/a state, control/position information/an orientation/a posture/an ID/a state of a terminal component, and a communication scheme/a frequency/a frequency band and the like of the communication unit 1-4 of the terminal 1.

Also, it is possible to include one or more communication units 1-4 and to use a wireless LAN defined by IEEE802.11, Wigig (registered trademark), IEEE802.11p, ITS communication standard, cellular communication such as LTE or 5G, wireless communication such as low power wide area (LPWA), or communication using ultrasonic waves, electricity, or light. Hereinafter, the number of communication units is defined as N (N is equal to or greater than 1).

The terminal is hardware capable of performing any of control of movement, operations, and the like of the terminal, control of a component of the terminal, and control of communication of the terminal, and for example, a car, a large-sized mobile car, small-sized mobile car, a mining/construction machine, a flying mobile body such as a drone, an two-wheel vehicle, a wheelchair, and a robot are assumed.

FIG. 1 is a block diagram illustrating a configuration example of a communication system according to the first embodiment. The communication system is configured of a terminal 1 that uses communication and an external device 2. The external device 2 is hardware capable of performing wireless communication with the terminal 1. The external device 2 may be a portable wireless terminal or a moving wireless terminal or may be a wireless base station fixed at a specific position.

The terminal 1 includes: a terminal NW unit 1-0 that is a functional block in the terminal and performs input and output; a communication evaluation unit 1-1 that evaluates quality of communication between the terminal and an external communication device; a terminal surrounding environment information collection unit 1-3 that collects surrounding environment information of the terminal using a visible light camera, an infrared camera, an electromagnetic wave sensor, an optical sensor, a ultrasonic sensor, or the like; an object detection unit 1-7 that extracts an object related to quality of the communication with the external communication device from a result output by the terminal surrounding environment information collection unit; communication units 1-4-1 to 1-4-N (N is an integer equal to or greater than 1) that communicates with the external device 2; a communication quality learning unit 1-5 that determines surrounding object information and an input and output relationship between the surrounding object information and communication quality to output future communication quality, from the surrounding object information, terminal information, and communication quality information; and a communication prediction unit 1-6 that predicts the future communication quality using the obtained input and output relationship, the surrounding object information, and the terminal information.

In an embodiment which will be described later, a terminal management unit 1-2 that controls the terminal, a terminal component, and terminal communication and generates terminal information including one or more of position information/an orientation/a posture/an ID/a state/control of the terminal, position information/an orientation/an ID/a state/control of the terminal component, and an attachment position/an orientation/an ID/a state/control of a communication device and a communication device positional relationship generation unit 1-9 that stores or generates position information of the external device 2 or a positional relationship with the terminal can be included.

Here, future communication quality to be predicted is communication quality of an arbitrary period of time later than information of a signal source input to the communication prediction unit 1-6. The arbitrary time specifically means a time later than $(T_S+T_A)$ that is a sum of a signal process time $T_S$ required by the surrounding environment information collection unit 1-3 to acquire information that is required by the object detection unit 1-7 to extract object information and required by the communication prediction unit 1-6 to perform prediction and an addressing time $T_A$ required for some control performed on the predicted communication quality.

The external device 2 includes external communication units 2-4-1 to 2-4-N that perform communication with the communication units 1-4-1 to 1-4-N of the terminal 1, respectively and is connected to a network 2-0.

Figure 2:
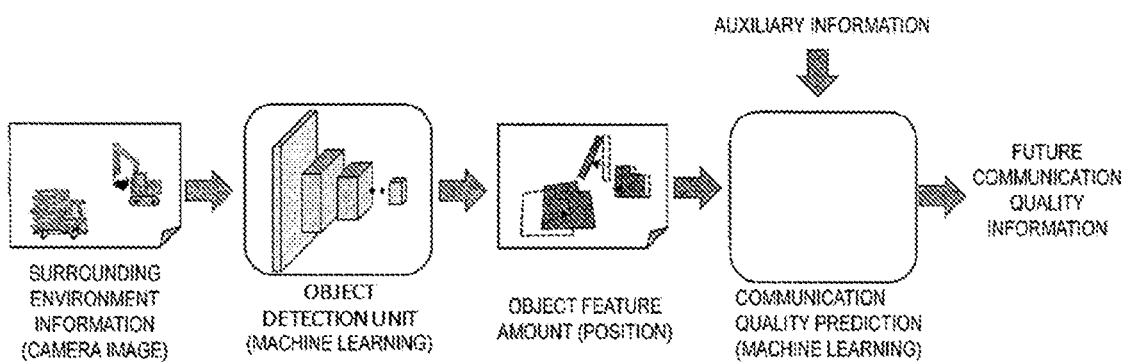
FIG. 2 is a diagram for explaining an approach for predicting future communication quality in the communication system according to the present invention.

FIG. 2 illustrates an overview of a flow for predicting future communication quality in the communication system according to the first embodiment. Hereinafter, a flow mainly of the object detection unit 1-7 and the communication prediction unit 1-6 will be described using FIG. 2.

If the surrounding environment information collection unit 1-3 collects surrounding information from information from the camera and the sensor, then the object detection unit 1-7 extracts, from the information, the position, the size, and state information of an object that affects communication. Although the cubes inside the object detection unit in the drawing are illustrated with an image of using deep learning in which a plurality of convolutional layers are used for determination, it is possible to use an engine for machine learning, a representative example of which is deep learning. The object information extracted here is information including at least one of a type, a position (a two-dimensional position or a three-dimensional position including a depth), a shape, and a color of the object or at least a part of the object. In the illustrated example, recognition of states of a car or a construction machinery vehicle and an arm thereof is illustrated as an example.

Here, although the object detection unit 1-7 acquires the object information at a certain time cycle, it is possible to perform statistical processing on information within a specific period of time because a burden of an arithmetic operation performed by the communication quality prediction unit 1-6 is reduced. In a case in which the time cycle at which communication quality is predicted is 1 second, and the camera obtains a video at 10 frames per second (FPS), for example, the object information can be acquired at every 1/10 seconds. In other words, it is possible to obtain ten pieces of object information when one index is obtained by the communication prediction unit 1-6. In a case in which the communication prediction unit 1-6 performs prediction at a cycle of Tc seconds, and the object detection unit 1-7 performs object detection at a cycle of To seconds, it is possible to use at least object information corresponding to an integer obtained by rounding off the value obtained by Tc/To to the nearest decimal for communication quality prediction performed once. The number is defined as No. Although it is also possible to directly use it as No sets of input signals, communication quality to be addressed has a cycle of To, and it is thus possible to perform statistical processing to obtain information at a cycle of To.

As long as the information relates to the position and the shape, it is possible to use center values and average values of first (oldest) object information, the last (latest) object information, both the first and last object information, and the same obtained information or average values or center values obtained by deleting some information at both extremes from among the obtained No sets of pieces of object information. Further, it is also possible to extract information regarding how first to No-th object information has been changed as change information. For example, change information (speed information) in position information (two-dimensional coordinates or three-dimensional coordinates including the depth), color change information, object shape or size change information, and rotation speed information are exemplified. Further, it is also possible to extract difference information from the first to No-th information and further information regarding acceleration by further extracting difference information from the difference information. It is also possible to use an inclination of a graph obtained by performing fitting with a quadratic function to minimize a square error on distribution obtained by plotting position information with respect to time, instead of simply using the difference information. For example, it is possible to obtain acceleration information by extracting a difference in the first to (No−1)-th object information from the second to No-th object information and further obtaining each difference using the obtained (No−1) pieces of difference information or to obtain acceleration from a fitting curve to minimize the square error as described above.

Further, the object detection unit 1-7 can further include an object filter unit to perform filtering using the object information and delete unnecessary information. For example, the object filter unit can store, in advance, the fact that the communication quality has not been affected in objects at positions lower than a specific value in the height direction in the object information, and it is possible not to output the object information that meets the condition. Also, it is possible to acquire position information from the terminal management unit 1-2, store the type of the object that has an influence in the object filter unit in accordance with an area where the terminal is present, and not output the object information corresponding to unnecessary information to the communication prediction unit 1-6.

Similarly, it is also possible to acquire position information of the external device 2 corresponding to communication, for which communication prediction is to be performed, from the communication device positional relationship generation unit 1-9 and not to output the object information at positions of low relevance to the position of the communication device 2.

Further, it is possible to limit the types of objects for which the object detection unit 1-7 is to perform determination, using information from the terminal management unit 1-2 and to reduce a burden of the arithmetic operation performed by the object detection unit 1-7. For example, it is possible to not perform recognition of car objects at home or in a parking, to recognize person objects on public roads while not recognizing them on highways, or to change objects to be detected in accordance with a moving speed of the terminal.

The thus obtained object information is input to the communication prediction unit 1-6. The communication prediction unit 1-6 outputs future communication quality from input object information on the basis of the input and output relationship (learning model) generated by the communication quality learning unit 1-5 using deep learning including machine learning algorithms such as a support vector machine, a multilayer perceptron, a k-nearest neighbor method, and a random forest, a recurrent neural network (RNN), a convolutional neural network (CNN), and a long short term memory (LSTM). Also, a configuration in which a plurality of different coefficients, different schemes, and different coupling methods are prepared from the aforementioned schemes and a determined result is selected through majority vote or a determination result with high reliability is selected from a plurality of determination results may be employed.

Filtering processing may be performed for selecting, as information to be input to the communication prediction unit 1-6, information obtained by the object detection unit 1-7 and the terminal management unit 1-2 extracting a new feature amount through main component analysis using the object information, the terminal information, and the feedback information from the outside and performing dimensionality reduction to reduce the number of parameters or for selecting information that satisfies a certain condition. The dimensionality reduction may be centrally performed on the feedback information from the object detection unit 1-7, the terminal management unit 1-2, and the outside.

A case in which auxiliary information other than the object information is used as an input signal to output future communication quality will be described. The communication evaluation unit 1-1 can input parameters related to obtained current or past communication quality to the communication prediction unit 1-6. Also, it is possible to input terminal information from the terminal management unit 1-2 to the communication prediction unit 1-6. Further, it is possible to input a positional relationship between the position of the external device 2 and the object information stored in advance from the communication device positional relationship generation unit 1-9 to the communication prediction unit 1-6.

On the other hand, the communication quality learning unit 1-5 learns an input and output relationship between the parameters related to the current and past communication quality and the object information and can generate a learning model by further taking into account the terminal information and the positional relationship information as well.

Further, it is also possible to output a plurality of candidates for the future communication quality information. In a case in which position information of the terminal 1 is input as auxiliary information, it is possible to apply an input and output relationship to a plurality of different patterns by preparing and inputting a plurality of future states that the terminal can be brought into, and to predict a plurality of patterns of future communication quality. In this manner, the terminal can select an option to improve communication quality.

Here, it is also possible to include an object updating unit in the object detection unit 1-7 to update the input and output relationship for obtaining object information by the object detection unit 1-7. Updating can be performed with an increase in objects that newly affect the communication as surrounding environment information such as distribution of drones with outrageous designs and flying cars with a change in design of existing objects, for example.

The terminal 1 can also include a communication quality learning unit 1-5 to learn a relationship between surrounding object information and communication quality. The communication quality learning unit 1-5 predefines a feature amount of object information to be input and performs machine learning. The machine learning is learning using machine learning algorithms such as a support vector machine, a multilayer perceptron, a k-nearest neighbor method, and a random forest, learning based on deep learning such as LSTM, RNN, and CNN, online learning based on a stochastic gradient descent method capable of successively adding learning, or the like. Also, a plurality of machine learning schemes used for the learning may be prepared to enable a plurality of types of communication quality prediction at the same time.

At the time of performing the learning, the object detection unit 1-7 and the terminal management unit 1-2 may use information obtained by extracting a new feature amount through main component analysis, performing dimensionality reduction on the object information, the terminal information, or both the object information and the terminal information, and reducing the number of parameters. Alternatively, learning may be performed on higher dimensional information or original parameters themselves. It is also possible to newly perform dimensionality reduction such as main component analysis to update the parameters to be input to the communication prediction unit 1-6.

The learning can be performed in an actual environment with the terminal 1 actually performing communication, can be performed using another terminal or data acquired by another terminal specially prepared for the learning, or can be performed in a simulation space that simulates an environment that is as close to an actual environment in the real world as possible. It is also possible to use an input and output relationship learned in the simulation space or by a similar external terminal as transfer learning.

In a case in which the communication quality learning unit 1-5 is included in the terminal, a learning feedback generation unit 2-8 connected to the external NW 2-0 is further included, and learning feedback information obtained via the communication unit 1-4-$i$ can be used for learning. The feedback information is, for example, parameters related to communication with the terminal in the past, communication information including terminals other than the terminal 1 in the external communication unit 2-4, network information such as a degree of congestion of the network to which the external communication unit 2-4 is connected, and the numbers, moving information, density information, traffic occurrence conditions of terminals and persons using the communication unit, and statistical information thereof. The communication quality learning unit 1-5 can efficiently perform learning by excluding dynamic variations in communication quality that occur regardless of changes in surrounding environment, using the information. If it is assumed that the external communication unit 2-4 has changed a frequency or a frequency bandwidth used with the terminal 1 at a certain time cycle, for example, parameters related to communication quality such as a throughput significantly varies depending on setting of the communication, and it is thus possible to correct a change due to effects of a bandwidth and a signal-to-interference noise power ratio. It is possible to achieve standardization with the number of channels that can send data bits that increase depending on the bandwidth and to achieve standardization after creating a model of the amount of increase in the number of transmission bits generated by a difference in the signal-to-interference noise power ratio in advance. The learning feedback generation unit 2-0 can also mainly feed back information included in each or a part of the external communication units 2-4-1 to 2-4-N and obtained from the external communication unit 2-4.

In regard to the learning for predicting communication quality, it is also possible to cause a device connected to an external NW to learn by outputting necessary information from the terminal to the external device 2 as will be described later. The input and output relationship (learning model) learned by the device can be acquired via the communication unit 1-4 and can be used by the communication prediction unit 1-6.

It is also possible to improve efficiency of learning and prediction by limiting conditions under which it is desired to predict communication quality. For example, it is also possible to perform learning such that the communication prediction unit 1-6 predicts only a specific event related to communication quality. Specifically, the communication quality learning unit 1-5 or the communication quality learning unit 2-5 connected to the NW, which will be described later, performs learning such that the communication prediction unit 1-6 predicts a communication quality degradation event with a high correspondence with each or both of surrounding object information and terminal information. In other words, the communication quality learning unit 1-5 or 2-5 stores steady time communication quality for terminal information from a result (for example, a result of performing statistical processing such as exclusion on a mode value, an average value, or a singularity determined therefrom) of steadily evaluating terminal information including the position of the terminal 1 for quality of communication between the external device 2 and the terminal 1, and performs machine learning of communication quality (a communication quality degradation event or a communication quality improvement event) that is separated from the steady time communication quality by a predetermined threshold value or more. The communication quality learning unit 1-5 or 2-5 outputs the thus learned learning model to the communication prediction unit 1-6.

Note that the communication quality degradation event can be defined as an event that predefined communication quality criteria (a bit number per time, a bit number per time and frequency, a packet loss, a packet loss rate, RSSI degradation, RSRQ degradation, a packet transmission rate, how much these parameters have changed from those in normal time, and a feature amount extracted from the plurality of parameters) satisfy predefined conditions. Also, the communication quality degradation event may also be defined as an event categorized as communication quality degradation due to a change in surrounding object information or base station management information in classification of machine learning. Here, a case in which RSSI degradation and a packet loss have occurred at the same time, for example, is exemplified as the feature amount extracted from the plurality of parameters.

In a case in which targets to be learned are limited, learning only target events may lead to a bias, and it is thus preferable to learn data in the steady state in which necessary parameters have been acquired as well. At this time, it is also possible to set a learning frequency using a specific event occurrence frequency. It is possible to use the frequency of occurrence of the communication quality degradation event to acquire data in the steady state at an equivalent learning frequency or to set the frequency to be $\alpha$ time as high as the frequency of occurrence ($0<\alpha<\infty$). Also, it is possible to set the number of samples to be $\alpha$ times as large as the number of samples for a specific event. On the contrary, it is possible to use, for learning, only data when a specific event occurs or only data when and before and after the specific event occurs in order to enhance detection accuracy of a specific event.

Second Embodiment

Figure 3:
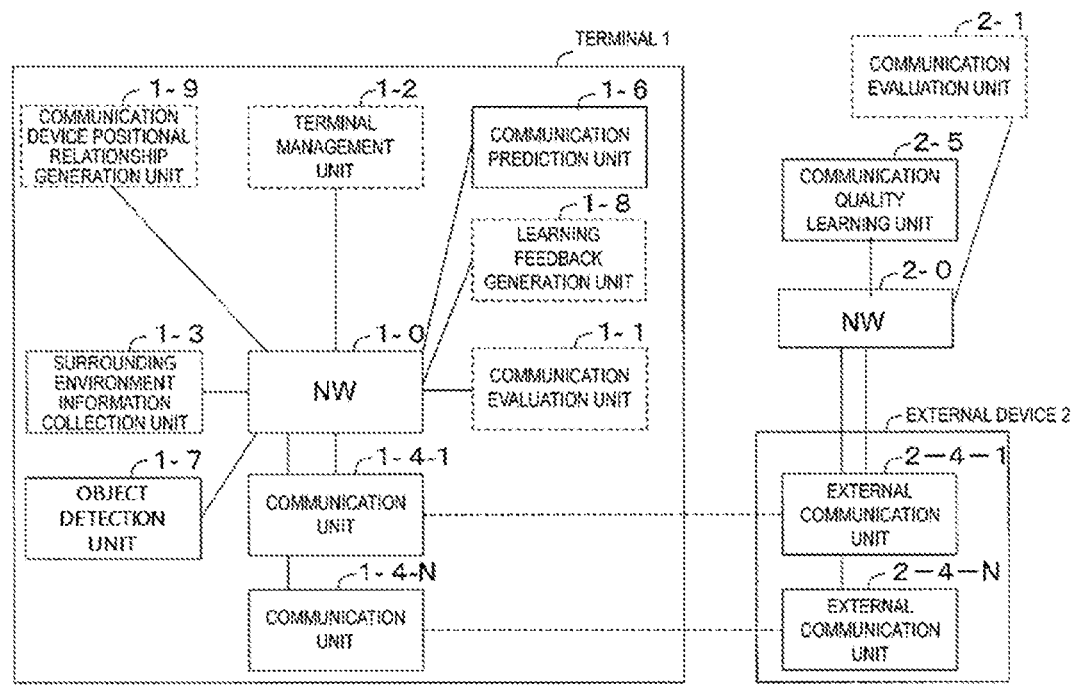
FIG. 3 is a diagram for explaining the communication system according to the present invention.

FIG. 3 is a block diagram illustrating a configuration example of a communication system according to the second embodiment. A terminal 1 according to the second embodiment includes an object detection unit 1-7, a communication prediction unit 1-6, and a communication unit 1-4, and the communication unit 1-4 transfers the communication quality and the object information to a communication quality learning unit 2-5 provided outside, and receives a learning model from the communication quality learning unit 2-5 to transfer the learning model to the communication prediction unit 1-6.

In the second embodiment, the communication quality learning unit 2-5 connected to the external NW is configured to perform learning for predicting communication quality. The terminal 1 includes the communication quality learning unit 1-5 in the communication system in the first embodiment, while the external network 2-0 includes the communication quality learning unit 2-5 in the communication system according to the second embodiment. Also, the terminal 1 includes a learning feedback generation unit 1-8 instead of the communication quality learning unit 1-5. The learning feedback generation unit 1-8 generates a learning feedback including at least one of object information, terminal information, and communication quality and inputs the learning feedback to the external communication quality learning unit 2-5 via the communication unit 1-4-$i$.

The communication quality learning unit 2-5 can use a large amount of information for learning since information for learning is input thereto from various terminals. The learning feedback generation unit 1-8 can generate feedback information by standardizing influences of unique information such as the type/the ID/the model of the terminal/the position of the communication device/the type of the communication device/the model of the communication device/ the type of the surrounding environment information collection unit/the attachment position of the surrounding environment information collection unit/the model of the surrounding environment information collection unit, and the like or can include the unique information in the feedback information, for each type of terminal and such that the communication quality learning unit 2-5 does not excessively perform learning due to problems unique to the terminal If the standardized learning feedback information is used, dependency on terminals can be reduced, and an input and output amount relationship (learning model) that can be widely used by many terminals can be obtained. On the other hand, if the learning feedback information including the unique information is used, terminals can be classified by uniqueness, and an input and output relationship (learning model) that can be applied for each category of terminals can be obtained. In the latter case, the communication quality learning unit 2-5 can determine appropriate classification from information from the terminals and can input the corresponding input and output relationship to the communication quality prediction unit 1-6 of the terminals. Terminals with different characteristics can also be used to generate input and output relationships in terminals of other classification by generating a conversion matrix through Bayesian optimization (BO) or the like of the input and output relationship and through transfer learning.

Further, the communication quality learning unit 2-5 can separately generate a condition under which the learned input and output satisfy predefined performance. An actually environment may be complicated, and the input and output relationship (learning model) may not operate properly. The learning quality learning unit 2-5 can thus collect conditions under which the input and output relationship does not operate through experience from the positions, the times, and the communication statuses of the terminals and can notify the terminals of the conditions via the external communication unit 2-4-$i$. The terminals can perform control such that the conditions are not met, or can apply additional information indicating that prediction reliability is low to the output of the communication prediction unit 1-6 when the conditions under which reliability of the input and output relationship is low are met. It is also possible to increase the frequency for learning and the frequency at which the learning feedback is generated such that the input and output relationship functions under the conditions.

Also, the communication quality learning unit 2-5 can determine importance of each parameter used for learning and can determine parameters that are not used for the prediction of communication quality. Note that the "parameters" indicate details included in the object information, details included in the terminal management information, and details in the auxiliary information. In a case in which a certain parameter is constantly not used, the communication quality learning unit 2-5 can stop using the parameter for learning or can stop the feedback to the learning feedback generation unit 1-8. Also, the communication quality learning unit 2-5 can update the setting to such setting that the parameter is not used by the communication prediction unit 1-6 and the object detection unit 1-7. Further, in a case in which the parameter has a condition, the setting is changed to such setting that the parameter is not used by the communication prediction unit 1-6 and the object detection unit 1-7 only under the condition. Because such a parameter may gradually change depending on a surrounding environment or a communication condition, utilization setting in the communication prediction unit 1-6 and the object detection unit 1-7 is updated as needed. It is also possible to enhance accuracy of communication prediction and to delete an unnecessary arithmetic operation and reduce a burden of performing an arithmetic operation by performing such parameter utilization setting.

In the second embodiment, a result measured by the communication evaluation unit 2-1 connected to the network of the external device 2 may be used without using a result measured by the communication evaluation unit 1-1 included. The communication evaluation unit may be included in the external device 2 or may be included in each external communication unit 2-4-*i*. It is possible to reduce the amount of feedback from the terminals using communication quality acquired by the external NW. In communication of providing a notification to a transmission side through acknowledgment (ACK) or a negative acknowledgment (NACK), in particular, it is possible to expect to ascertain the communication therebetween through transmission and reception.

In order for the communication quality learning unit 2-5 of the external NW to perform learning and in order to reduce a burden of feedback, it is necessary to determine in advance under what condition (time) information is to be included in the feedback information and at what timing the feedback is to be performed. As information to be included in the feedback, information (parameters) to be input to the communication prediction unit 1-6 and communication quality information at the corresponding time in the communication evaluation unit 1-1 are exemplified. Although the feedback for the latter information is not needed in a case in which the communication evaluation unit 2-1 of the external NW evaluates communication quality, it is necessary that the time to which the communication of the terminal corresponds is completely synchronized with the time understood by the external NW, or it is necessary for the external NW to ascertain a temporal deviation instead. Also, it is also not necessary to feed back the information (the parameters that are not used for predicting communication quality) provided as a notification from the external NW in the former information.

The timing at which the feedback information is generated may be at a predefined frequency, or may be determined on the basis of communication quality evaluated by the communication evaluation unit 1-1, communication quality predicted by the quality prediction unit 1-6, or a comparison result between the communication quality evaluated by the communication evaluation unit 1-1 and the communication quality predicted by the quality prediction unit 1-6. Also, details of the feedback information are details storing the communication quality evaluated by the communication evaluation unit 1-1 and the communication quality predicted by the quality prediction unit 1-6 at every timing.

For example, the timing can be set to a timing when the communication evaluation unit 1-1 detects steep quality degradation, a timing when a deviation from an expected value of communication quality in a case in which the object information obtained in advance is not observed occurs, a timing when the communication prediction unit 1-6 predicts communication quality degradation, or a timing when an output value of the object information satisfies a certain condition. Also, information for a certain period of time before and after the timing is satisfied may be fed back. Alternatively, parameters may be fed back in a case in which specific terminal information (such as position information) satisfies a condition. As a timing at which the generated feedback information is transferred to the communication quality learning unit 2-5 of the external NW, the transfer can be performed immediately, or a timing at which a communication cost is low may be selected, or a timing at which the communication unit 1-4-*i* with a low communication cost can be used may be set.

Third Embodiment

Figure 4:
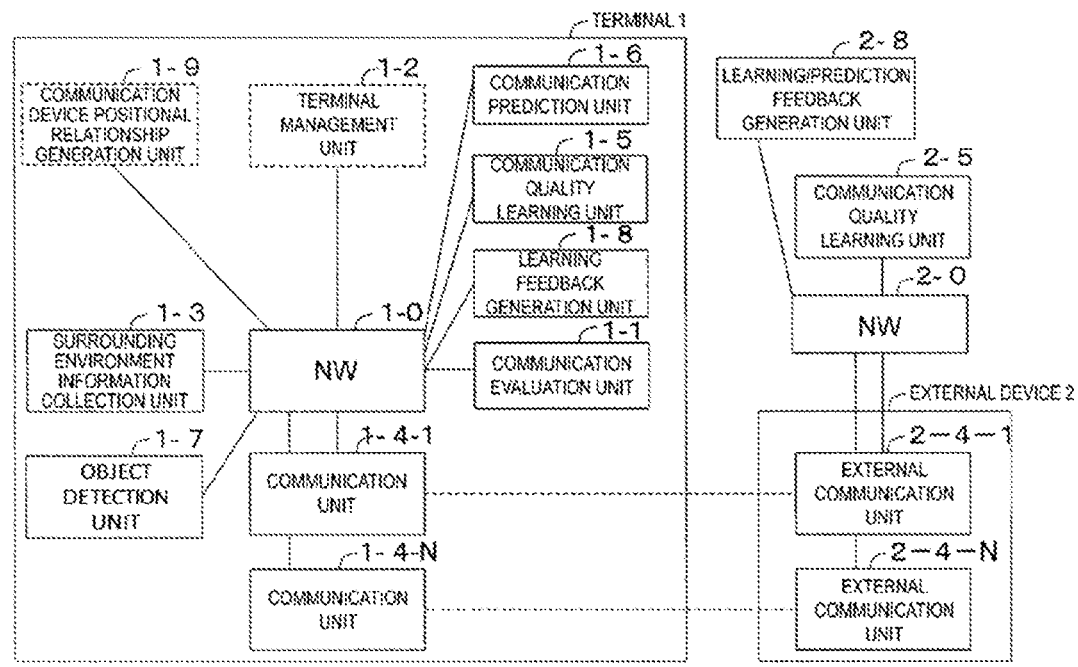
FIG. 4 is a diagram for explaining the communication system according to the present invention.

FIG. 4 is a block diagram illustrating a configuration example of a communication system according to the third embodiment. A terminal 1 according to the third embodiment includes: an object detection unit 1-7, a communication quality learning unit 1-5, a communication prediction unit 1-6, and a communication unit 1-4, the communication unit 1-4 transfers communication quality and object information to a different communication quality learning unit 2-5 that is provided outside, and receives a learning model from the different communication quality learning unit 2-5, to transfer the learning model to the communication quality learning unit 1-5, the communication quality learning unit 1-5 updates the learning model from the different communication quality learning unit 2-5 with object information and terminal information that is information related to the terminal itself, and the communication prediction unit 1-6 predicts communication quality using the learning model updated by the communication quality learning unit 1-5.

In the third embodiment, both the terminal 1 and an external NW 2-0 are configured to perform learning for predicting communication quality. In the third embodiment, the communication quality learning unit 2-5 and a learning feedback generation unit 2-8 are included in the external network 2-0, and the communication quality learning unit 1-5 and a learning feedback generation unit 1-8 are included in the terminal 1. The learning feedback generation unit 1-8 generates learning feedback from surrounding object information, terminal information, and communication quality and inputs the learning feedback to the external communication quality learning unit 2-5 via a communication unit 1-4-*i*.

The communication quality learning unit 2-5 can perform learning from a large amount of information since information for learning is input from various terminals. If standardized learning feedback information is used, dependency on terminals can be reduced, and input and output amount relationships (learning model) that can be widely used by many terminals can be obtained. On the other hand, if learning feedback information including unique information is use, terminals can be classified by uniqueness, and an input and output relationship (learning model) that can be applied for each category of terminals can be obtained. In the latter case, the communication quality learning unit 2-5 can determine appropriate classification from information from the terminals and input corresponding input and output relationship to the terminals.

In the present embodiment, an input and output relationship (learning model) learned by the external communication quality learning unit 2-5 is input to the communication quality learning unit 1-5 of the terminal 1, and the communication quality learning unit 1-5 updates the learning model to enhance accuracy of the prediction of communication quality with respect to the surrounding information unique to the terminal 1 and the input information from the terminal information. In other words, the communication quality learning unit 1-5 updates the learning model using information from the object detection unit 1-7, the terminal management unit 1-2, and the communication evaluation unit 1-1 and outputs the updated learning model to the communication prediction unit 1-6.

According to the communication system in the third embodiment, it is possible to reflect results of learning obtained by terminals other than the terminal 1 or through simulation and to enhance accuracy of prediction in accordance with information unique to the terminal.

Fourth Embodiment

Figure 5:
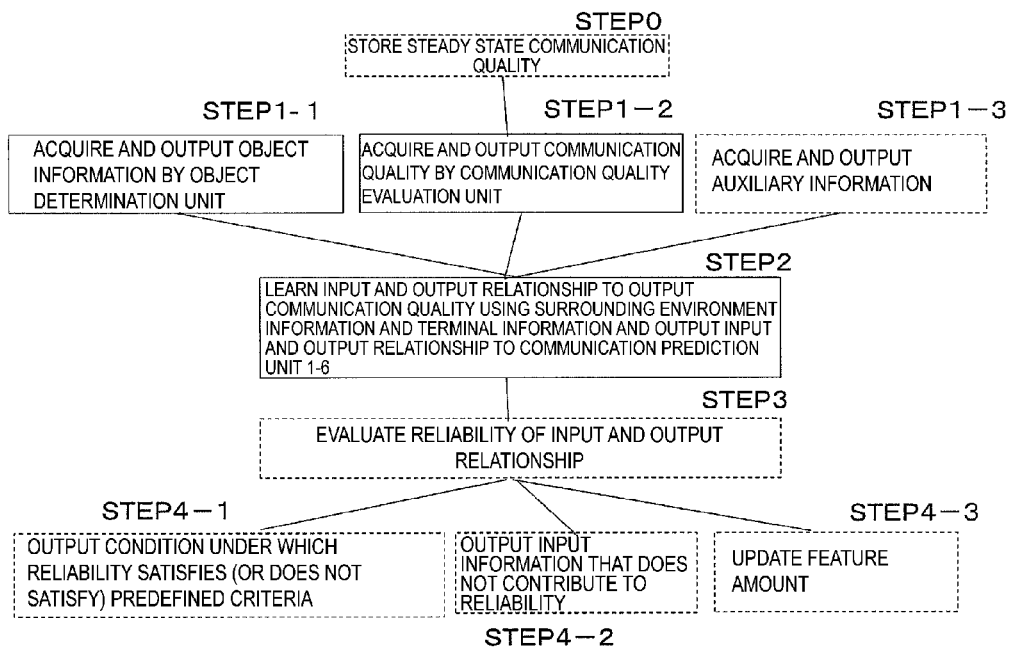
FIG. 5 is a diagram for explaining a method for predicting future communication quality in the communication system according to the present invention.

FIG. 5 is a diagram for explaining a flow of machine learning performed by the communication quality learning unit 1-5 or 2-5 in the communication system according to the first to third embodiment. First, a flow in a block surrounded by the solid line, which is a minimum form, will be described. In order to predict communication, the surrounding environment information collection unit 1-3 acquires surrounding environment information and inputs the result thereof to the object detection unit. Note that the surrounding environment is moving objects such as cars and pedestrians and fixed objects such as buildings and trees in the surrounding of the base station.

The object detection unit 1-7 generates object information as described above and outputs the object information to the communication quality learning unit 1-5 or 2-5 (Step 1-1). The communication evaluation unit 1-1 or 2-1 acquires communication quality at a certain time (Step 1-2) and outputs the communication quality to the communication quality learning unit 1-5 or 2-5 or both the communication quality learning units 1-5 and 2-5. The communication quality learning unit 1-5 or 2-5 performs machine learning using the object information and if needed, terminal information and creates an input and output relationship (learning model) for outputting future communication quality. The communication quality learning unit 1-5 or 2-5 outputs the learning model to the communication prediction unit 1-6 (Step 2). The communication prediction unit 1-6 uses the learning model to estimate future communication quality from information including at least the object information based on current surrounding environment information acquired by the surrounding environment information collection unit 1-3.

In the learning method in FIG. 5, it is possible to input terminal information, external communication device information, and the like as auxiliary information to the communication quality learning unit 1-5 or 2-5 in order to enhance accuracy of prediction through learning (Step 1-3). The auxiliary information indicates information representing relationships between the terminal and the external communication unit that performs communication with the terminal, which is generated by the communication device positional relationship generation unit 1-9, information regarding control/position information/an orientation/a posture/an ID/a state of the terminal/control/position information/an orientation/a posture/an ID/a state of the terminal component, which is generated by the terminal management unit 1-2, terminal information including one or more pieces of information regarding a communication scheme/a frequency/a frequency band and the like of the communication unit of the terminal, and information with a correlation with communication quality input from the learning feedback generation units 1-8 and 2-8. As the auxiliary information, one or a plurality of these may be used.

In the learning method in FIG. 5, the communication prediction unit 1-6 can store communication quality in a steady state in advance in order to enhance learning efficiency with respect to input communication quality information or to provide a specific communication event (degradation of communication quality or an improvement in communication quality) (Step 0). The steady communication quality described here indicates communication quality expected in a case there are no influences of objects that significantly affect the communication or simply an expected value obtained from past communication quality. This method is effective when the objects that significantly affect the communication are limited and the objects appear at low frequencies or a time during which no objects are present continues for a specific time or longer. In other words, it is possible to obtain communication quality from the terminal information without using machine learning in the steady state, that is, if there are no objects. It is only necessary to determine whether objects can affect communication quality from object information only in a case in which the objects are present, and it is only necessary to perform learning on the objects. In the contrary, in a case in which objects that affect communication are constantly present, it is possible to use a mode value or an average value of the communication quality as communication quality in the steady state. It is possible to standardize communication quality, the value of which ranges widely depending on the location or conditions, by setting the amount of change with respect to the steady communication quality as a learning target, and it is thus possible to efficiently perform the learning. Also, it is possible to standardize in advance a change that may occur depending on setting of a frequency and a frequency band to be used for the steady communication quality described here, as described above.

Also, it is possible to store an average value in accordance with terminal information (position information and state information of the terminal) and to store an average value of past communication quality data, from past communication records of the terminal or communication of other terminals. At this time, it is also possible to perform filtering with detection information of surrounding object information and to store an expected value in a case in which there are no objects. In a case in which past communication quality data is simply used, it is also possible to use the past communication quality data with influences of parameters that affect communication quality, such as a used frequency bandwidth, a consumption mode, and the like removed. It is also possible to perform learning only in a case in which communication quality in the steady state obtained here is equal to or less than a predefined threshold value.

In the learning method in FIG. 5, it is possible to improve efficiency of the following learning and prediction and to enhance accuracy after learning an input and output relationship and evaluating classification of the range to which the input and output relationship is applied, prediction accuracy, or importance of the input parameters. In Step 3, the data acquired for learning is used to evaluate reliability of the input and output relationship. Some evaluation methods will be described below.

First Evaluation Method

An input and output relationship (learning model) that has already been learned is used to evaluate prediction performance for new learning data. In a case in which the prediction performance is low, there are a case in which sufficient learning has not been performed with respect to the number of input parameters (the number of dimensions) and it is expected that the prediction performance is improved if the number of pieces of data increases and more learning is performed and a case in which it is not possible to predict communication under the data conditions. It is possible to expect an effect achieved by continuing the learning in the former case, and there is a probability that no learning is needed in the latter case. The communication quality learning unit 1-5 or 2-5 can employ a strategy of more actively taking new information as an input and output relationship to perform learning or a strategy of not performing learning with uncertain data in order to enable reliable estimation of communication quality. In the former case, learning is constantly performed, and the fact that reliability of the leaning data is low at present is extracted and stored as a low reliability condition. In the latter case, it is also possible not to use the learning data for leaning of the input and output relationship and to store the condition as a low reliability condition.

The communication quality learning unit 1-5 or 2-5 can also have a plurality of input and output relationships, actively learn one of the input and output relationships with all the parameters, and learn the other input and output relationships using parameters that can be determined to have high estimation accuracy in advance from the conventional learning result. In this manner, the communication quality learning unit 1-5 or 2-5 can prepare a plurality of input and output relationships, and the communication prediction unit 1-6 of the terminal 1 can be caused to predict communication quality using the plurality of input and output relationships.

The communication quality learning unit 1-5 or 2-5 stores a high reliability condition instead of the low reliability condition in a case in which reliability (a correct answer rate and a small error of determination) is high.

In this manner, the communication quality learning unit 1-5 or 2-5 stores a condition under which the reliability satisfies (or does not satisfy) predefined criteria (Step 4-1). The obtained condition is input to the communication prediction unit 1-6, and if an input signal with a condition under which the input and output relationship does not have sufficient reliability is input, it is possible to apply additional information indicating inaccuracy to the communication quality prediction result or not to predict communication.

Second Evaluation Method

Importance of input information is evaluated. The communication quality learning unit 1-5 or 2-5 detects how much the input parameters have been referred to and extracts objects and parameters that have not been referred to (Step 4-2). It is possible to improve efficiency of the learning and the prediction as follows, for example, by feeding back objects and parameters that have not been used or objects and parameters that have been used to the object detection unit 1-7 and the communication prediction unit 1-6.

The object detection unit 1-7 can reduce a burden of performing an arithmetic operation or reduce the amount of information to be input to the communication prediction unit 1-6 and the learning feedback unit 2-8 by designating conditions of the types of objects, the positions of objects, and states of objects that do not affect communication and not detecting objects other than these objects or discarding the detection results.

In a case in which the conditions of the types of objects, the positions of the objects, and the states of the objects that affect communication depend on a condition of information that the terminal management unit 1-2 has, it is possible to acquire necessary information such as the position information of the terminal in advance from the terminal management unit 1-2, to optimize the conditions of the types of objects, the positions of the objects, and the states of the objects that affect communication, and thereby to reduce a burden of performing an arithmetic operation, or to reduce the amount of information to be input to the communication prediction unit 1-6 and the learning feedback unit 2-8.

In a case in which conditions of the type of the terminal management unit 1-2 and the learning feedback generation unit 2-8, the positions of the objects, and the states of the objects that are information that does not indicates the objects that affect communication depend on the condition of the information that the terminal management unit 1-2 has, it is possible to acquire necessary information such as the position information of the terminal 1 in advance from the terminal management unit 1-2, to optimize the conditions of the types of the objects, the positions of the objects, and the states of the objects that affect communication, and thereby to reduce a burden of performing an arithmetic operation, or to reduce the amount of information to be input to the communication prediction unit 1-6 and the learning feedback unit 2-8.

Third Evaluation Method

Main components used for prediction are updated (Step 4-3). The communication quality learning unit 1-5 or 2-5 may perform main component analysis on learning data, extract a new feature amount, perform dimensionality reduction, and then perform updating. In a case in which the communication quality learning unit 1-5 or 2-5 has updated how to use the feature amount through the aforementioned analysis, the communication quality prediction unit processes the input parameters in accordance with newly defined dimensionality reduction method and uses the processed parameters as parameters for predicting communication quality to predict communication quality with a newly defined input and output relationship.

Sixth Embodiment

Figure 6:
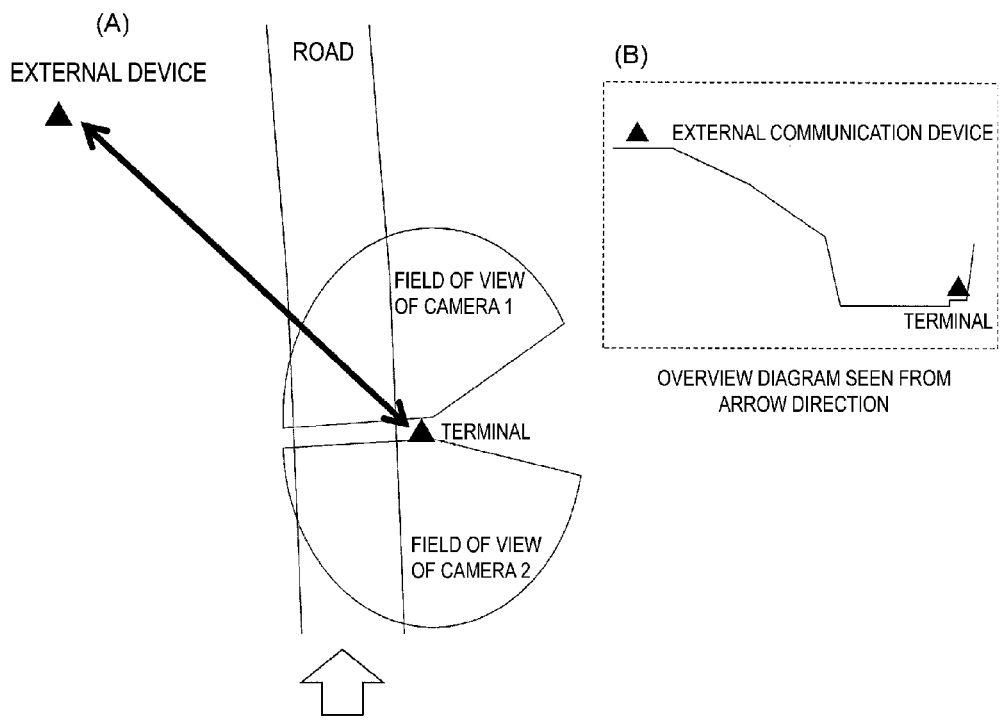
FIG. 6 is a diagram for explaining an experiment in the communication system according to the present invention.

FIG. 6 is a diagram of an experiment conducted to check the effects of the present invention. An external device that is a wireless LAN base station and a terminal were installed with a road sandwiched therebetween, videos from two cameras included in the terminal were used to predict quality of future communication performed between the external device and the terminal. Here, the wireless LAN used a 5 GHz band channel, and a standardization throughput obtained by dividing a throughput per 20 MHz by an average in the past 30 seconds was used as communication quality. The communication quality was evaluated every 1 second. As the cameras, a camera 1 facing upward and a camera 2 facing downward were used.

Figure 7:
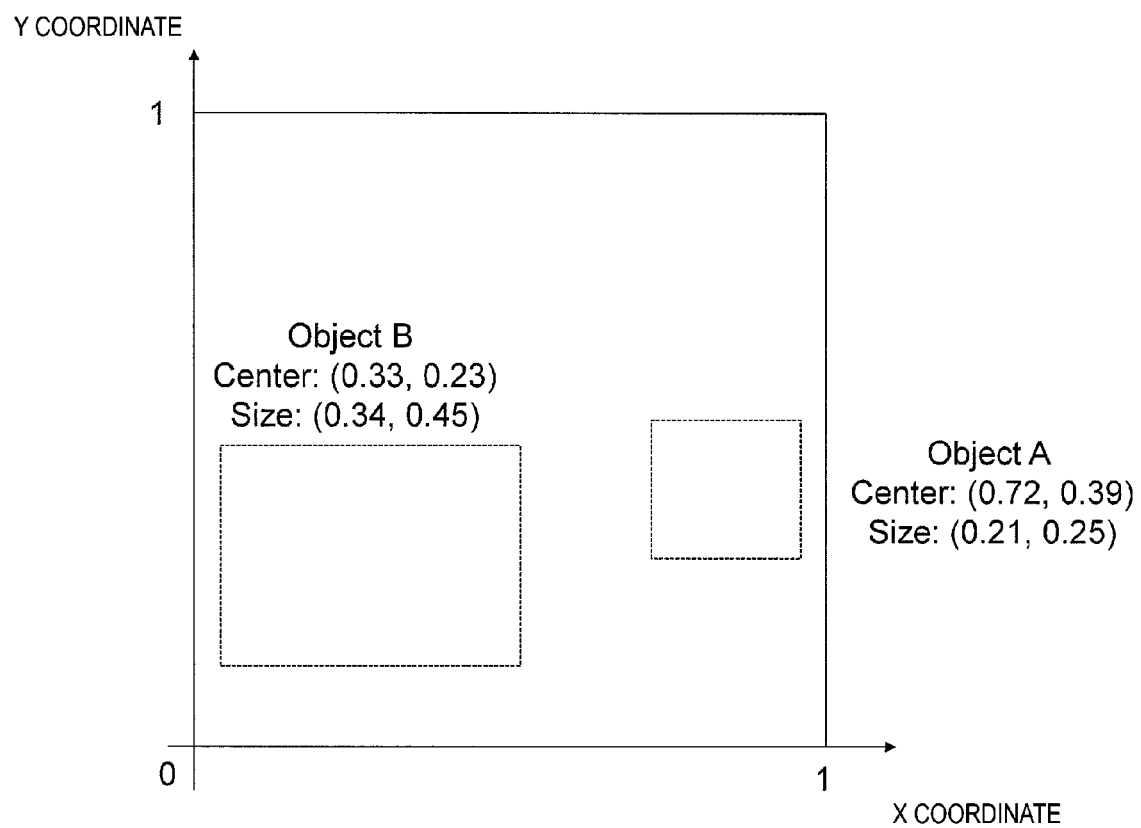
FIG. 7 is a diagram for explaining an experiment in the communication system according to the present invention.
Figure 8:
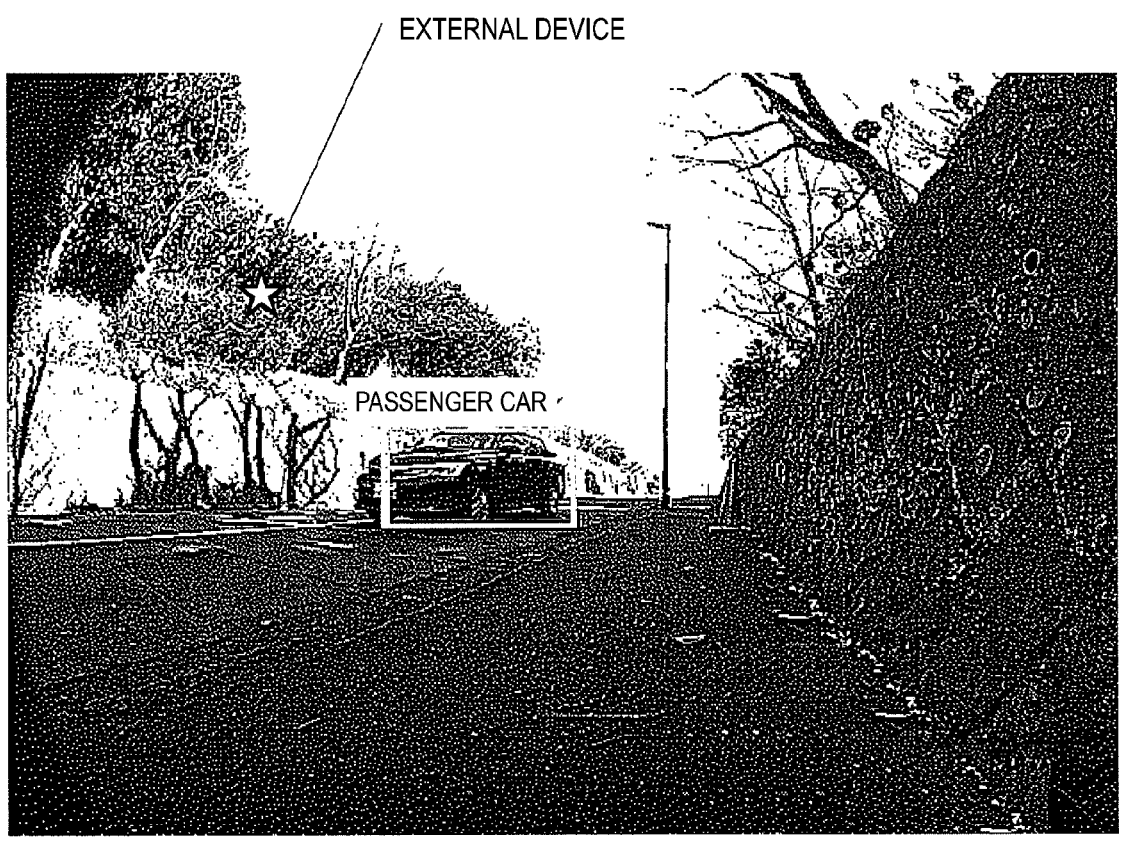
FIG. 8 is a diagram for explaining an experiment in the communication system according to the present invention.

Here, the videos from the cameras were acquired at 15 FPS, and the sizes on an X axis, the sizes on the Y axis, and the center positions of objects were extracted. Because fifteen pieces of object information were obtained at a cycle (1 second) of evaluating communication quality, fifteen pieces of position information and fifteen pieces of size information were averaged here, and the amounts of change in size and position with respect to the X axis and the Y axis were extracted as moving speeds. A detection example of sizes and positions of objects that were actually extracted by the object detection unit is illustrated in FIG. 7. A video image by the camera 1 in an actual environment and how a vehicle was recognized are illustrated in FIG. 8. Here, the location where the external device was present is also illustrated with a star mark for understanding. Although the communication path between the communication base station and the terminal was not blocked even if a passenger car passed, the communication path was blocked in a case in which a bus passed therethrough in the surrounding environment.

Figure 9:
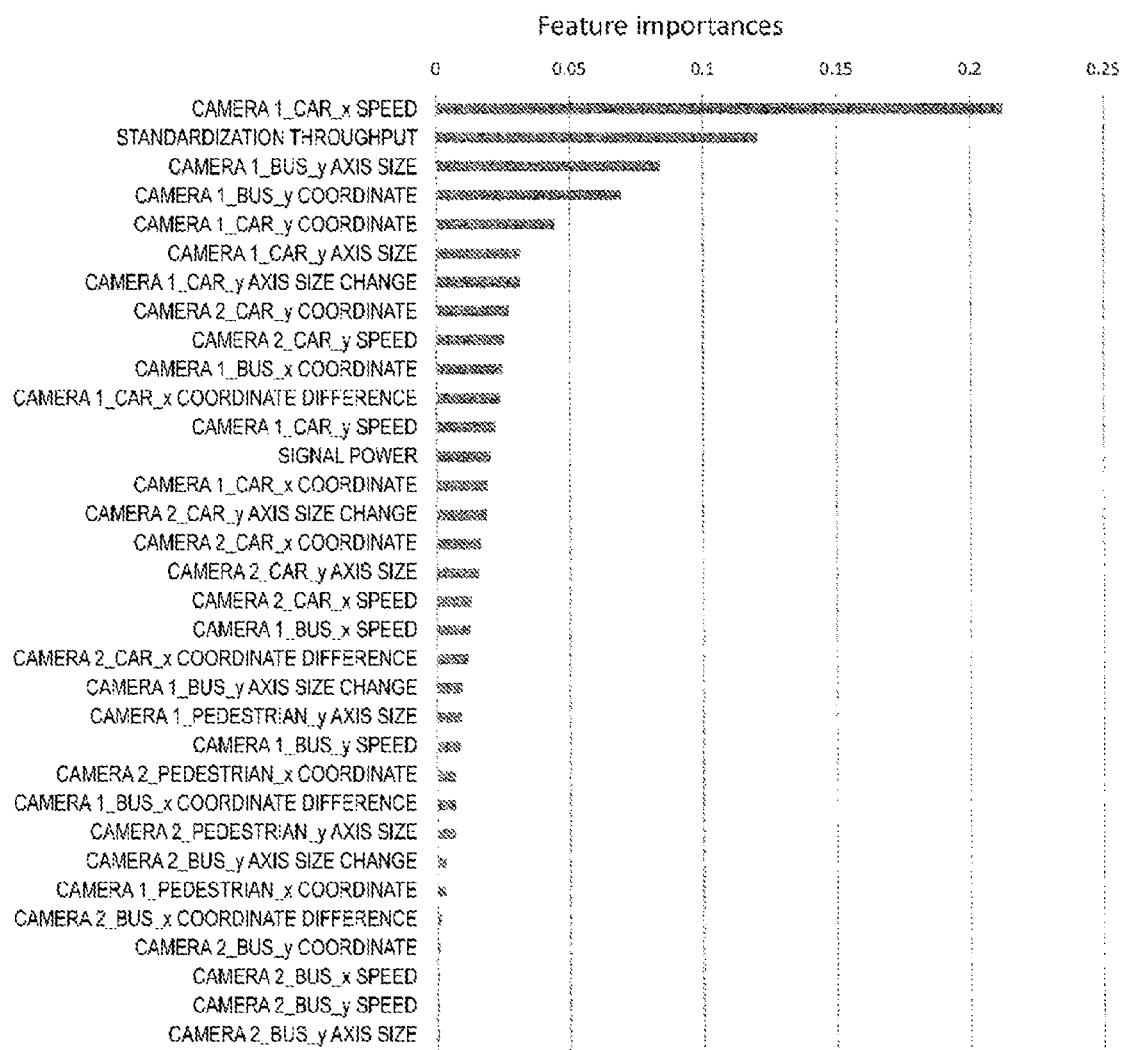
FIG. 9 is a diagram for explaining an experiment in the communication system according to the present invention.

Information regarding cars (passenger cars), buses, and pedestrians acquired from the camera 1 and the camera 2, current communication quality, and a signal power obtained in the current communication were used to predict future communication quality of 2 seconds later. Here, random forest learning was used to predict communication. FIG. 9 illustrates a result of calculating importance of feature amounts that are parameters that can be output through the random forest learning. It was the speed of the passenger car detected by the camera 1 that most significantly affected determination. Communication quality at present (standardization throughput) was the next parameter, and the Y axis position of the bus detected by the camera 1 was the next parameter that affected determination. It is possible to understand that important object information differs for the car and for the bus. This can be considered to be because while the bus blocks the communication path and degrades the signal power, an electromagnetic wave propagation route in the case of the car is dynamically changed due to reflection by the car and this changes the communication quality although the car does not block the communication path directly. It is possible to apply the result to Step 4-2 in FIG. 5, and not to use the result output by the camera 2, or not to use the bus/pedestrian objects detected by the camera 2. The method of dimensionality reduction may be updated in Step 4-3 in FIG. 5. Although FIG. 9 illustrates almost all pieces of data of output values, it is not necessary to calculate four speeds along the X axis, the Y axis, the X of the size, and the Y axis of the size, and a result obtained by adding the four parameters in accordance with the four parameters may be used. Although the X-axis and Y-axis positions were set from the positions in the image from the camera with a viewing angle of 180 degrees in the experiment, the positions may be converted into another coordinate system such as a coordinate system with reference to the base station or a coordinate system based on latitudes and longitudes and used, or the positions may be converted into position information on a general map and used.

Figure 10:
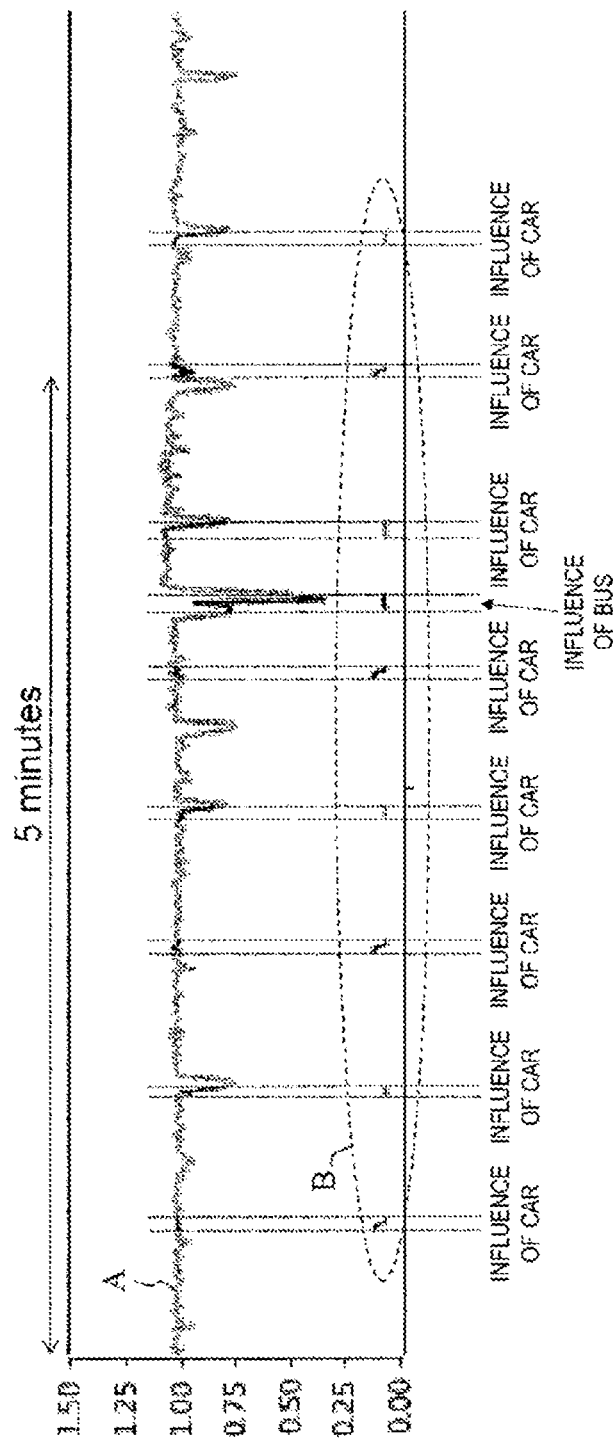
FIG. 10 is a diagram for explaining an experiment result of the communication system according to the present invention.

FIG. 10 is a diagram for explaining a measured standardization throughput and handling at the time of detecting objects. The line A represents the standardization throughput, and the plot B represents timings at which objects were identified from a video of the camera 1. As the objects, types such as pedestrians (humans), automobiles/bicycles (bikes), passenger cars (cars), and buses/trucks (buses) are defined.

It is possible to ascertain in FIG. 10 that the standardization throughput is affected by passing of a bus and a passenger car. In comparison between the bus and other vehicles, the standardization throughput (communication quality) is degraded when a bus passes, while the standardization throughput is not necessarily degraded when a car passes. In FIG. 6, the car moving from the upper side to the lower side of the road (moving from the range of the camera 1 to the range of the camera 2) more affects communication quality than the car moving from the lower side to the upper side of the road (moving from the range of the camera 2 to the range of the camera 1). This is considered to be because cars are supposed to travel on the left side in Japan and cars passing closer to the terminal more affects the communication quality.

Seventh Embodiment

Figure 11:
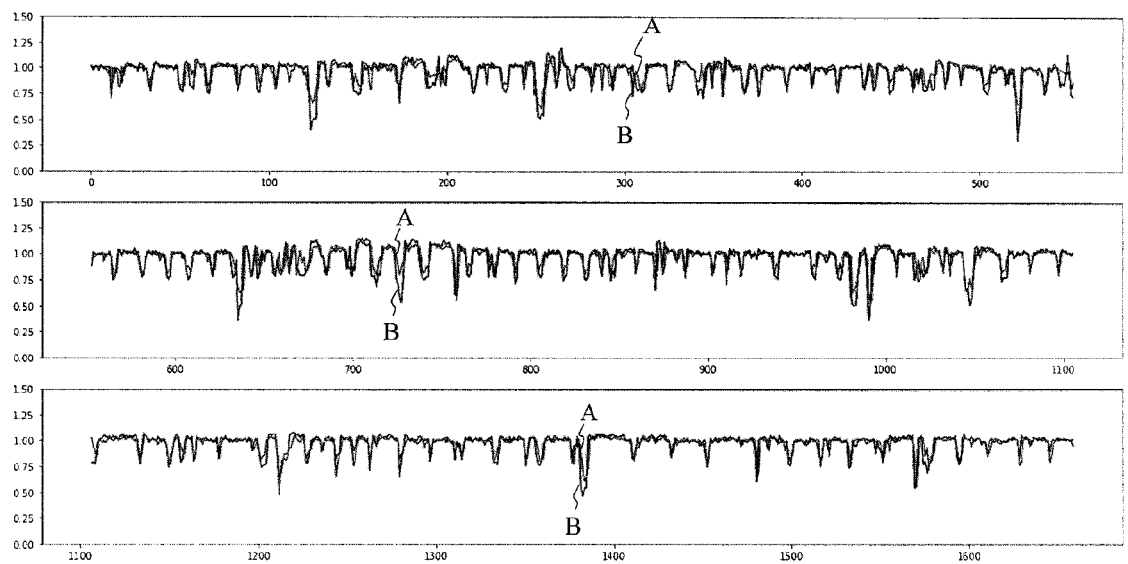
FIG. 11 is a diagram for explaining an experiment result of the communication system according to the present invention.

FIG. 11 is a diagram for explaining a result of predicting communication quality of one second later. The communication quality learning unit uses random forest learning using 500 determination trees, uses data corresponding to three hours, divides the data into five by the k-fold cross validation method, and performs training with four data sets, thereby generating a learning model. The communication prediction unit predicts communication quality (standardization throughput) for the remaining one data set using the learning model. The input data is a video from the camera illustrated in FIG. 8 and communication information. The result represents a result that also includes a case in which only data at timings when cars and buses go back and forth near the terminal is extracted and there are no influences of passenger cars on communication quality as described above.

FIG. 11 illustrates comparison between predicted communication quality A and actually measured communication quality B. If degradation of communication quality is focused, the line of the communication quality A and the line of the communication quality B are lowered at the same time, and it is possible to confirm that the communication prediction unit is able to predict degradation of communication quality in actual measurement.

Eighth Embodiment

Figure 12:
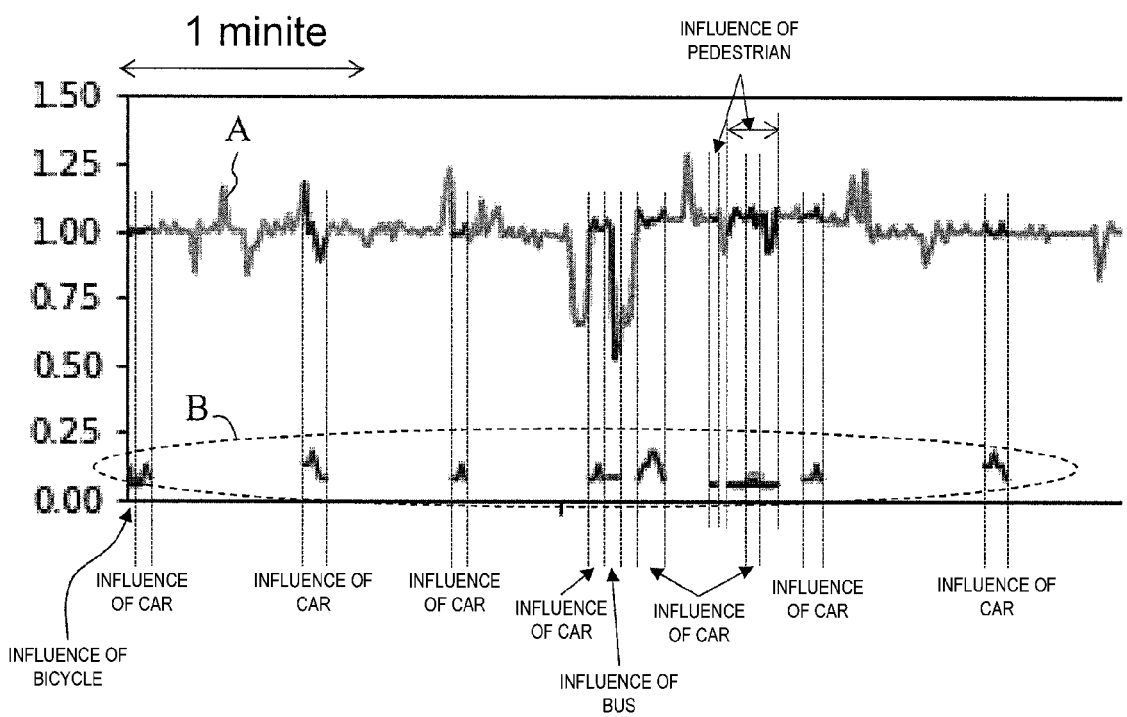
FIG. 12 is a diagram for explaining an experiment result of the communication system according to the present invention.

In the eighth embodiment, the fact that position information of the terminal significantly affects accuracy of predicted communication quality will be described. FIG. 12 is also a diagram for explaining a measured standardization throughput and handling at the time of detecting objects similarly to FIG. 10 in the sixth embodiment. The line A represents the standardization throughput, and the plot B represents timings at which objects were identified from a video of the camera 1. As the objects, types such as pedestrians (humans), motorcycles/bicycles (bikes), passenger cars (cars), and buses/trucks (buses) are defined. However, in the eighth embodiment, object detection based on the standardization throughput and the camera is performed with the terminal moved by about 10 cm with respect to the sixth embodiment. Communication quality is not affected by passing of passenger cars at all but is affected by passing of buses in the eighth embodiment as well.

Figure 13:
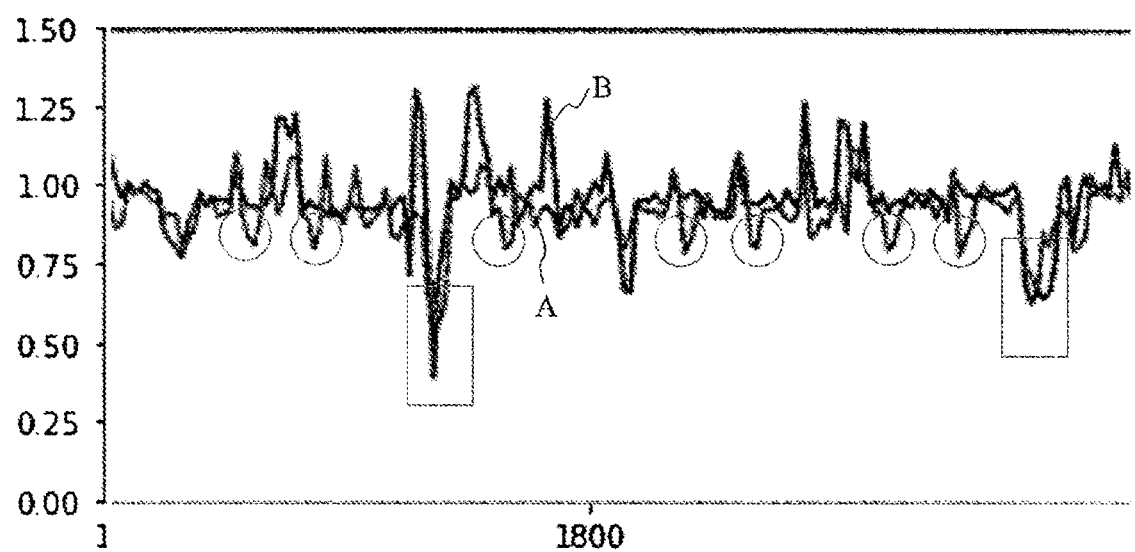
FIG. 13 is a diagram for explaining an experiment result of the communication system according to the present invention.

FIG. 13 is a result of comparison between the communication quality A predicted as in FIG. 11 of the seventh embodiment and actually measured communication quality B. However, the communication quality A is a result of performing prediction with an input and output relationship learned with data before the terminal is caused to move. In other words, the communication quality A is a result of performing prediction with a learning model of deviating positional information of the wireless terminal. The timing illustrated with circles is a timing at which no degradation occurred in the actually standardization throughput while degradation of the standardization throughput was predicted to occur due to the passenger vehicle. The timing illustrated with squares is a timing at which the communication prediction unit predicted that degradation of the standardization throughput occurred due to the bus and degradation occurred in the actually measured standardization throughput.

In this manner, the object information to be used is changed by the position information of the terminal, and it is necessary to change the input and output relationship. On the other hand, excessively high precision of position information of the terminal leads to an increase in information to be needed for learning and an increase in cost. It is also possible to group terminal information (position information, in particular) to which an input and output relationship with the same conditions can be applied, by determining whether or not the input and output relationship can be applied in Step 4-1 in FIG. 5. It is desirable that the communication quality learning unit 1-5 or 2-5 perform learning under a condition of a case in which the terminal is present in a certain range and the input and output relationship be used only within the range. For example, one-hot processing or position information reduction processing is performed such that the position of the terminal corresponding to the grouping processing is the same information when the position information is input to the communication prediction unit. Alternatively, it is also possible to realize this by turning on or off the information to be used depending on a location while using the input and output relationship itself. In the example in FIG. 13, the communication quality at the circles in the drawing is prevented from being determined to have been degraded, by not inputting the object information of the passenger car to the communication prediction unit at this location.

Other Embodiments

The terminal in the aforementioned embodiments may be implemented by a computer. In such a case, the terminal may be implemented by recording a program for implementing each of components included in each device in a computer-readable recording medium and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a computer-readable recording medium that stores programs dynamically for a short period of time, one example of which is a communication line used when a program is sent via a communication channel such as a network (e.g., the Internet) and a telephone line, and may also include such a computer-readable recording medium that stores programs for a certain period of time, one example of which is volatile memory inside a computer system that functions as a server or a client in the above-described case. In addition, the program described above may be a program used for implementing some of the components described above, a program that can implement the components described above by being combined with a program that has already been recorded in a computer system, or a program that is implemented using hardware such as a programmable logic device (PLD) or a field programmable gate array (FPGA).

The embodiments of the present invention have been described above in detail with reference to the drawings. However, specific configurations are not limited to those embodiments, and include any design or the like within the scope not departing from the gist of the present invention.

Additional Description

An overview of the present invention is summarized as follows.

A communication system that uses surrounding environment information of a base station acquired by a camera, a sensor, and the like and terminal information including one or more pieces of information regarding position information/an orientation/a posture/an ID/a state of the terminal/control of a terminal component/terminal control to predict current or future communication quality. An input and output relationship for outputting communication quality is learned using the surrounding environment information, the terminal information, and the communication quality to create a learning model, and the communication quality is predicted using the learning model, the surrounding environment information, and the terminal information. It is also possible to improve accuracy using a positional relationship with the communication device that is a target of communication, to predict communication quality for a plurality of future operation patterns, to store a correct answer rate of the prediction, and to extract information in a case of a prediction error and feedback the information to the learning unit.

REFERENCE SIGNS LIST

1 Terminal
1-0 Network
1-1 Communication evaluation unit
1-2 Terminal management unit
1-3 Surrounding environment information collection unit
1-4, 1-4-1, . . . , 1-4-N Communication unit
1-5 Communication quality learning unit
1-6 Communication prediction unit
1-7 Object detection unit
1-8 Learning feedback generation unit
1-9 Communication device positional relationship generation unit
2 External device
2-0 External network
2-1 Communication evaluation unit
2-5 Communication quality learning unit
2-4, 2-4-1, . . . , 2-4-N External communication unit
2-8 Learning/prediction feedback generation unit

The invention claimed is:

1. A communication system including an external device that communicates with a terminal, the system comprising:
    a camera or sensor configured to collect surrounding environment information about the terminal's surroundings;
    a processor; and
    a storage medium having computer program instructions stored thereon, when executed by the processor, perform to:
    evaluate wireless communication quality between the external device and the terminal;
    periodically extract a predetermined object associated with the communication quality from the surrounding environment information about the terminal's surroundings and outputs the predetermined object along with a feature amount of the object as object information;
    execute machine learning on a relationship between the communication quality between the external device and the terminal, and the object information to generate a learning model; and
    apply the object information to the learning model to predict communication quality of a predetermined period of time later;
    wherein the computer program instructions further perform to use steady time communication quality obtained by collecting information regarding the communication quality to terminal information that is information related to the terminal for a specific period of time and performing statistical processing on the collecting information, to perform machine learning with the communication quality that is more than a predetermined threshold value away from the steady time communication quality for the terminal information.

2. The communication system according to claim 1, wherein the object information is obtained by performing statistical processing on a plurality of pieces of the object information acquired at different times.

3. The communication system according to claim 1, wherein the computer program instructions further perform to generate terminal information that is information related to the terminal,
generate the learning model with the terminal information also included in the relationship, and
predict the communication quality with the terminal information also included.

4. The communication system according to claim 1, wherein the computer program instructions further perform to generate positional relationship information from positions of the terminal and the external device,
generate the learning model with the positional relationship information also included in the relationship, and
predict the communication quality with the positional relationship information also included.

5. A communication system including an external device that communicates with a terminal, the system comprising:
a camera or sensor configured to collect surrounding environment information about the terminal's surroundings;
a processor; and
a storage medium having computer program instructions stored thereon, when executed by the processor, perform to:
evaluate wireless communication quality between the external device and the terminal;
periodically extract a predetermined object associated with the communication quality from the surrounding environment information about the terminal's surroundings and outputs the predetermined object along with a feature amount of the object as object information;
execute machine learning on a relationship between the communication quality between the external device and the terminal, and the object information to generate a learning model; and
apply the object information to the learning model to predict communication quality of a predetermined period of time later; wherein the computer program instructions further perform to update an object definition that designates the predetermined object extracted by the object detection unit.

6. The communication system according to claim 1, wherein the surrounding environment information is characterized by information on pedestrians, motorcycles, passenger cars, buses and trucks.

7. The communication system according to claim 5, wherein the object information is obtained by performing statistical processing on a plurality of pieces of the object information acquired at different times.

8. The communication system according to claim 5, wherein the computer program instructions further perform to
generate terminal information that is information related to the terminal,
generate the learning model with the terminal information also included in the relationship, and
predict the communication quality with the terminal information also included.

9. The communication system according to claim 5, wherein the computer program instructions further perform to generate positional relationship information from positions of the terminal and the external device,
generate the learning model with the positional relationship information also included in the relationship, and
predict the communication quality with the positional relationship information also included.

10. The communication system according to claim 5, wherein the surrounding environment information is characterized by information on pedestrians, motorcycles, passenger cars, buses and trucks.

11. A terminal of a communication system, which communicates with an external device that is included in the communication system, the terminal comprising:
a camera or sensor configured to collect surrounding environment information about the terminal's surroundings;
a processor; and
a storage medium having computer program instructions stored thereon, when executed by the processor, perform to:
evaluate wireless communication quality between the external device and the terminal;
periodically extracts a predetermined object associated with the communication quality from the surrounding environment information about the terminal's surroundings and outputs the predetermined object along with a feature amount of the object as object information;
executes machine learning on a relationship between the communication quality between the external device and the terminal, and the object information to generate a learning model;
applies the object information output to the learning model generated to predict communication quality of a predetermined period of time later; and
transfers the communication quality and the object information to a different communication quality learning unit that is provided outside, and receives the learning model from the different communication quality learning unit,
updates the learning model from the different communication quality learning unit using the object information and terminal information that is information related to the terminal itself, and
predicts communication quality using the learning model updated.

* * * * *